US011199613B2

(12) United States Patent
Cao

(10) Patent No.: US 11,199,613 B2
(45) Date of Patent: Dec. 14, 2021

(54) RETRACTABLE HOUSING FOR A SENSING SYSTEM AND A METHOD OF USE

(71) Applicant: Faraday&Future Inc., Gardena, CA (US)

(72) Inventor: Chi Hung Cao, Huntington Beach, CA (US)

(*) Notice: Subject to any disclaimer, the term of this patent is extended or adjusted under 35 U.S.C. 154(b) by 0 days.

(21) Appl. No.: 16/031,938

(22) Filed: Jul. 10, 2018

(65) Prior Publication Data

US 2020/0018826 A1    Jan. 16, 2020

(51) Int. Cl.
   *G01S 7/481*    (2006.01)
   *B60R 11/00*    (2006.01)
   *G01S 17/931*   (2020.01)

(52) U.S. Cl.
   CPC ........... *G01S 7/4813* (2013.01); *B60R 11/00* (2013.01); *G01S 17/931* (2020.01); *B60R 2011/004* (2013.01)

(58) Field of Classification Search
   CPC ..... G01B 11/14; G01B 11/026; G01B 11/004; G01S 17/06; G01S 17/08; G01S 17/42
   USPC ............... 356/614–623, 4.01, 3.01, 3.1, 4.1; 250/559.29
   See application file for complete search history.

(56) References Cited

U.S. PATENT DOCUMENTS

| 4,922,171 | A  | * | 5/1990  | Ohi        | B60H 1/00835  |
|           |    |   |         |            | 165/202       |
| 5,031,103 | A  | * | 7/1991  | Kamimura   | G05D 1/027    |
|           |    |   |         |            | 180/167       |
| 8,330,942 | B2 | * | 12/2012 | Nordenfelt | G01C 15/002   |
|           |    |   |         |            | 356/3.01      |
| 10,220,799| B2 | * | 3/2019  | Kasai      | B60R 11/04    |
| 2004/0189287 | A1 | * | 9/2004 | Suzuki    | B60N 2/002    |
|           |    |   |         |            | 324/207.24    |
| 2010/0182611 | A1 | * | 7/2010 | Sudoh     | G01B 11/002   |
|           |    |   |         |            | 356/498       |
| 2017/0234977 | A1 | * | 8/2017 | Kim       | G01S 7/4876   |
|           |    |   |         |            | 356/5.01      |
| 2018/0356503 | A1 | * | 12/2018 | Konrad   | G01S 7/4817   |

* cited by examiner

*Primary Examiner* — Hoa Q Pham

(57) ABSTRACT

An electronics housing assembly is disclosed. In some embodiments, the electronics housing is attached to a vehicle to house a sensor of the vehicle (e.g., a LIDAR). The electronics housing includes a fixed body structure, a movable body structure, a motor operatively coupled to the movable body structure, a positioner sensor coupled to the fixed body structure, and a sensor bracket attached to the movable body structure and configured to attach to a sensor. In some embodiments, the positioner sensor is used to detect the position of the movable body structure and the sensor.

16 Claims, 10 Drawing Sheets

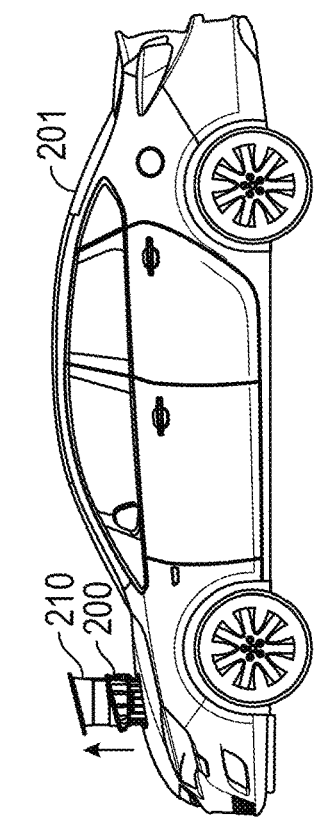
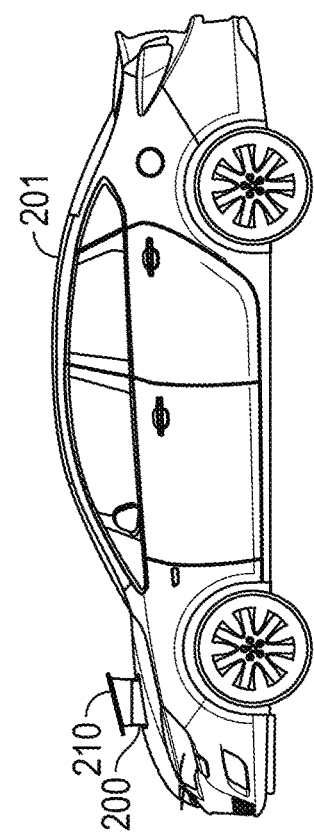
FIG. 2

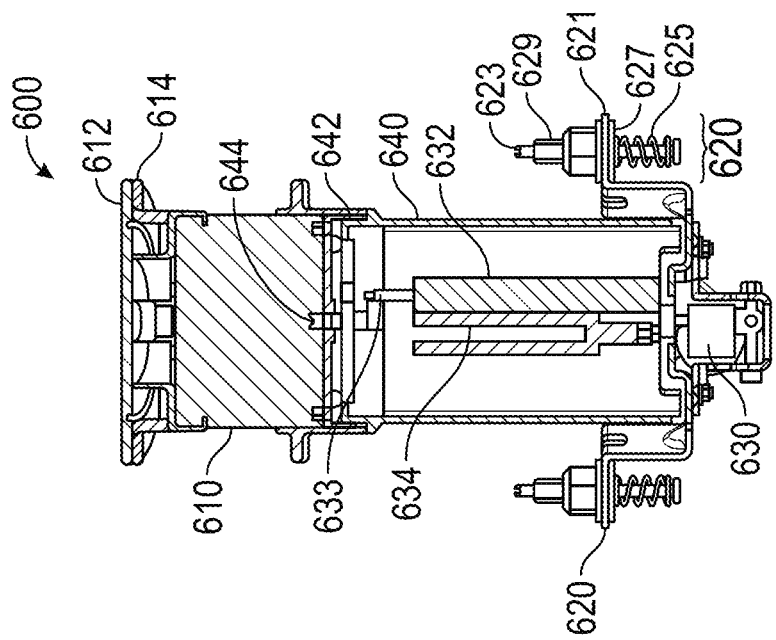
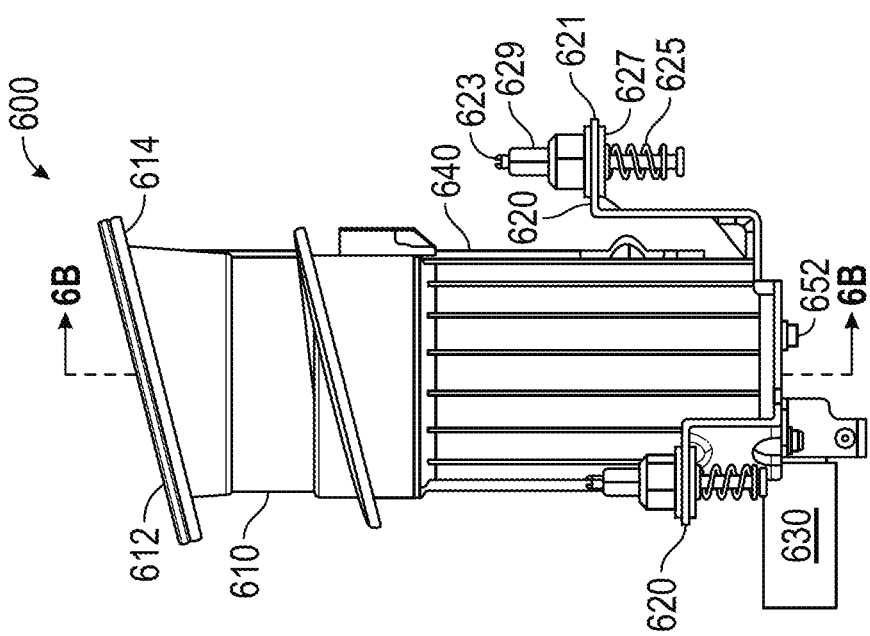

RETRACTABLE HOUSING FOR A SENSING SYSTEM AND A METHOD OF USE

FIELD OF THE DISCLOSURE

The present invention relates generally to vehicle sensor technology and more particularly to a housing for a sensor incorporated into an autonomous vehicle.

BACKGROUND

Some vehicles, such as some consumer automobiles, are capable of operating in autonomous driving modes including fully autonomous driving modes, semi-autonomous driving modes, and manual driving modes with driver assistance features. To safely and effectively operate in autonomous driving modes, the vehicles rely on sensors (e.g., radar, LIDAR, ultrasonic sensors, range sensors, one or more cameras, etc.) to detect the position of objects in the vehicle's vicinity. In this way, the vehicle can avoid a collision while operating autonomously. In order to gather the necessary sensor data to operate in autonomous driving modes, the vehicle includes sensors mounted at locations on the vehicle to enhance the sensor's field of view. However, in some examples, sensor placement can interfere with aerodynamics or create a hazard for pedestrians and animals near the vehicle. Therefore, it can be desirable to house one or more sensors within a structure that can be deployed when the sensor is in use (e.g., during an autonomous driving mode) and retracted when the sensor is not in use. In addition, it can be advantageous to allow the sensor to be removed and serviced or replaced if necessary without removing or taking apart the housing.

SUMMARY

The present invention relates generally to vehicle sensor technology and more particularly to a housing for a sensor incorporated into an autonomous vehicle. In some embodiments, the housing can support a sensor (e.g., LIDAR) for use during autonomous driving modes (e.g., fully autonomous driving, semi-autonomous driving, and driver assistance systems), for example. Housing can include a fixed housing body and a movable housing body. In some embodiments, the movable housing body is operatively coupled to a motor that actuates to raise and lower the movable housing body. A sensor can be attached to the movable housing body by a sensor bracket, thereby enabling the motor to raise and lower the sensor. In this way, the sensor can be raised when it is in use and lowered when it is not in use, thereby improving aerodynamics of the vehicle. In some embodiments, the housing further includes a positioner sensor for detecting the position of the movable body structure of the housing. The positioner sensor can be a magnetic potentiometer with a variable resistance that depends on the position of a magnet attached to the movable body structure of the housing. Sensing circuitry of the vehicle that is operatively coupled to the magnetic potentiometer senses the resistance of the magnetic potentiometer so that an onboard computer of the vehicle can determine the position of the movable body structure and, therefore, the sensor.

BRIEF DESCRIPTION OF THE DRAWINGS

FIG. 2 illustrates a vehicle 201 outfitted with a retractable sensor 210 according to examples of the disclosure.

FIGS. 6A-6B illustrate a retractable sensor housing 600 according to examples of the disclosure.

DETAILED DESCRIPTION

In the following description, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "autonomous driving" (or the like) can refer to autonomous driving, partially autonomous driving, and/or driver assistance systems.

The present invention relates generally to vehicle sensor technology and more particularly to a housing for a sensor incorporated into an autonomous vehicle. In some embodiments, the housing can support a sensor (e.g., LIDAR) for use during autonomous driving modes (e.g., fully autonomous driving, semi-autonomous driving, and driver assistance systems), for example. Housing can include a fixed housing body and a movable housing body. In some embodiments, the movable housing body is operatively coupled to a motor that actuates to raise and lower the movable housing body. A sensor can be attached to the movable housing body by a sensor bracket, thereby enabling the motor to raise and lower the sensor. In this way, the sensor can be raised when it is in use and lowered when it is not in use, thereby improving aerodynamics of the vehicle. In some embodiments, the housing further includes a positioner sensor for detecting the position of the movable body structure of the housing. The positioner sensor can be a magnetic potentiometer with a variable resistance that depends on the position of a magnet attached to the movable body structure of the housing. Sensing circuitry of the vehicle that is operatively coupled to the magnetic potentiometer senses the resistance of the magnetic potentiometer so that an onboard computer of the vehicle can determine the position of the movable body structure and, therefore, the sensor.

Figure 1:
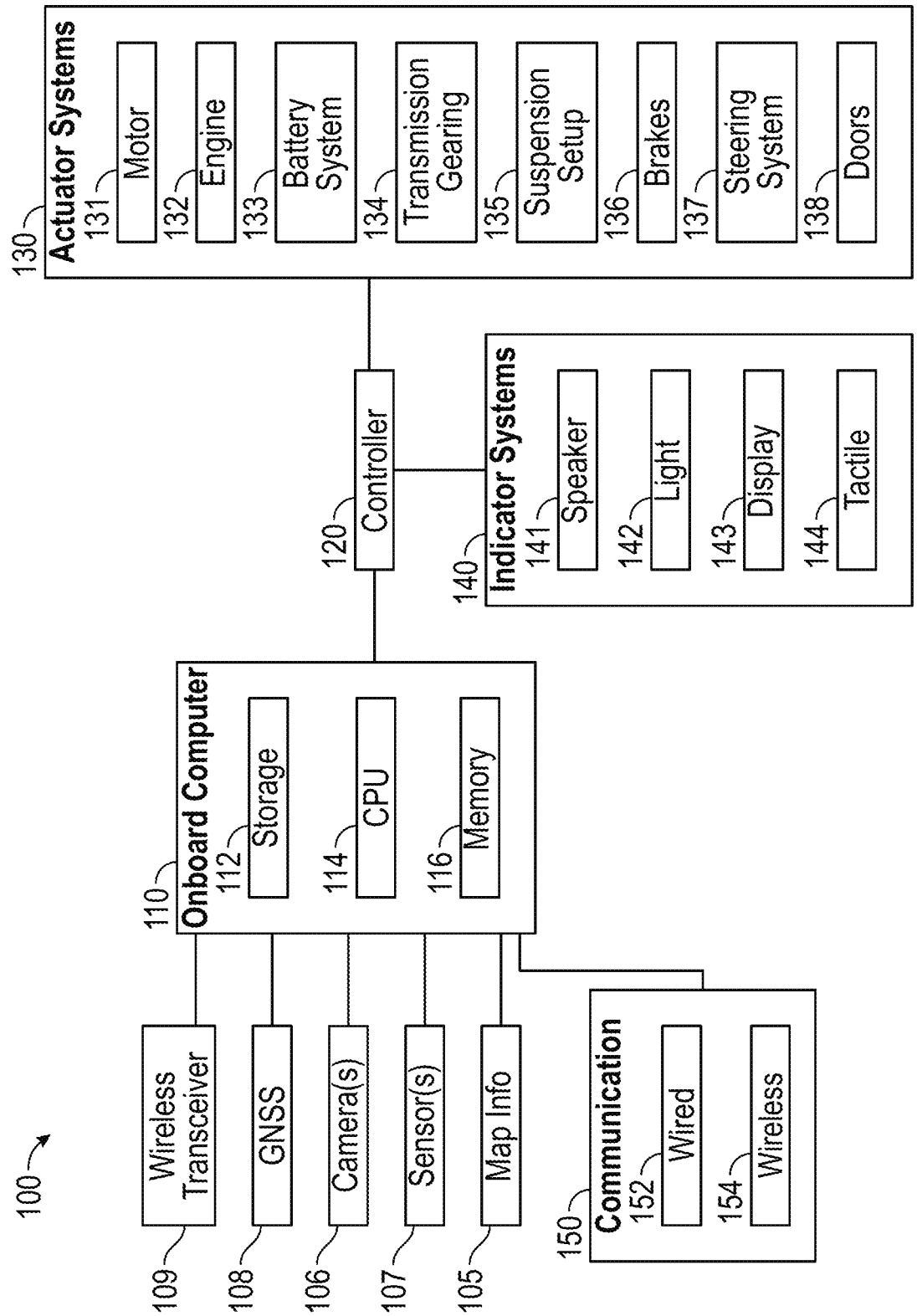
FIG. 1 illustrates a system block diagram of vehicle control system 100 according to examples of the disclosure.

FIG. 1 illustrates a system block diagram of vehicle control system 100 according to examples of the disclosure. Vehicle control system 100 can perform any of the methods described with reference to FIGS. 2-9 below. System 100 can be incorporated into a vehicle, such as a consumer automobile. Other example vehicles that may incorporate the system 100 include, without limitation, airplanes, boats, or industrial automobiles. In some embodiments, vehicle control system 100 includes one or more cameras 106 capable of capturing image data (e.g., video data) for determining various features of the vehicle's surroundings.

Vehicle control system 100 can also include one or more other sensors 107 (e.g., radar, ultrasonic, LIDAR, IMU, suspension level sensor, etc.) capable of detecting various features of the vehicle's surroundings, and a Global Navigation Satellite System (GNSS) receiver 108 capable of determining the location of the vehicle. In some embodiments, sensors 107, such as LIDAR, are used to identify objects in the vehicle's vicinity during autonomous driving modes including a fully autonomous driving mode, a partially autonomous driving mode, and/or driver assistance modes and features. It should be appreciated that GNSS receiver 108 can be a Global Positioning System (GPS) receiver, BeiDou receiver, Galileo receiver, and/or a GLONASS receiver. In some examples, vehicle control system 100 can further include a wireless transceiver 109 configured for receiving information from other vehicles and/or from smart infrastructure.

Vehicle control system 100 further includes an on-board computer 110 that is coupled to the cameras 106, sensors 107, GNSS receiver 108, map information interface 105, and wireless transceiver 109 and is capable of receiving outputs from the sensors 107, the GNSS receiver 108, map information interface 105, and wireless transceiver 109. The on-board computer 110 is capable of locating objects in the vicinity of the vehicle so that the vehicle can avoid a collision during an autonomous driving mode. On-board computer 110 includes one or more of storage 112, memory 116, and a processor 114. Processor 114 can perform any of the methods described below with reference to FIGS. 2-9. Additionally, storage 112 and/or memory 116 can store data and instructions for performing any of the methods described with reference to FIGS. 2-9. Storage 112 and/or memory 116 can be any non-transitory computer readable storage medium, such as a solid-state drive or a hard disk drive, among other possibilities.

In some embodiments, the vehicle control system 100 is connected to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137 and door system 138. The vehicle control system 100 controls, via controller 120, one or more of these actuator systems 130 during vehicle operation; for example, to control the vehicle during fully or partially autonomous driving operations, using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). The vehicle control system 100 controls, via controller 120, one or more of these indicator systems 140 to provide visual and/or audio indications, such as an indication that a driver will need to take control of the vehicle, for example.

FIG. 2 illustrates a vehicle 201 outfitted with a retractable sensor 210 according to examples of the disclosure. In some embodiments, vehicle 201 can be capable of operating in an autonomous driving mode using sensor 210 to detect obstacles in the vicinity of the vehicle so the vehicle can avoid a collision. Sensor 210 can include a LIDAR, a radar, an ultrasonic sensor, or another sensor for detecting the position of nearby objects. In some embodiments, sensor 210 can be housed by a retractable sensor housing 200. In this way, sensor 210 can be raised when the vehicle 201 is operating in an autonomous driving mode and retracted when it is not in use. In some embodiments, when the sensor 210 is fully retracted, the top of the sensor is flush with the hood of vehicle 201, thereby protecting the sensor and improving the aerodynamics of vehicle 201. When the sensor 210 is fully deployed, it can be positioned to have a field of view up to 360 degrees.

Figure 3:
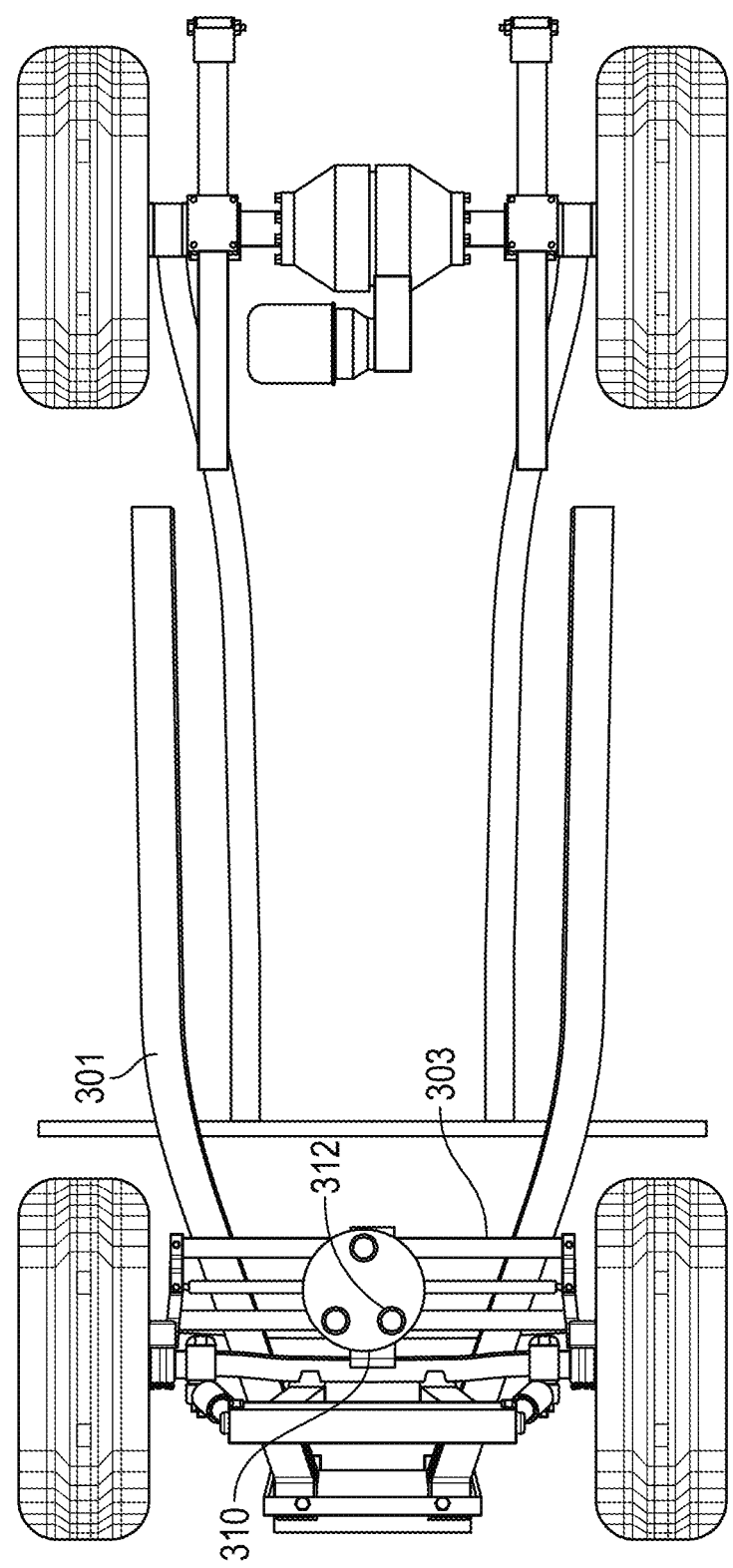
FIG. 3 illustrates a vehicle chassis 301 indicating the mounting location of a retractable sensor housing 310 according to examples of the disclosure.

FIG. 3 illustrates a vehicle chassis 301 indicating the mounting location of a retractable sensor housing 310 according to examples of the disclosure. In some embodiments, retractable sensor housing 310 is attached to the vehicle chassis 301 at a location beneath the hood of the vehicle. When the sensor is fully retracted, it can be under the vehicle hood, with the top of the sensor flush with the vehicle hood. In this way, the sensor can be protected when not in use. Retractable sensor housing 310 can be attached to body structure 303 by brackets 312. In some embodiments, brackets 312 can be flexible in three dimensions, as will be described below, along with a detailed description of the sensor housing 300, with reference to FIGS. 4-9.

Figure 4B:
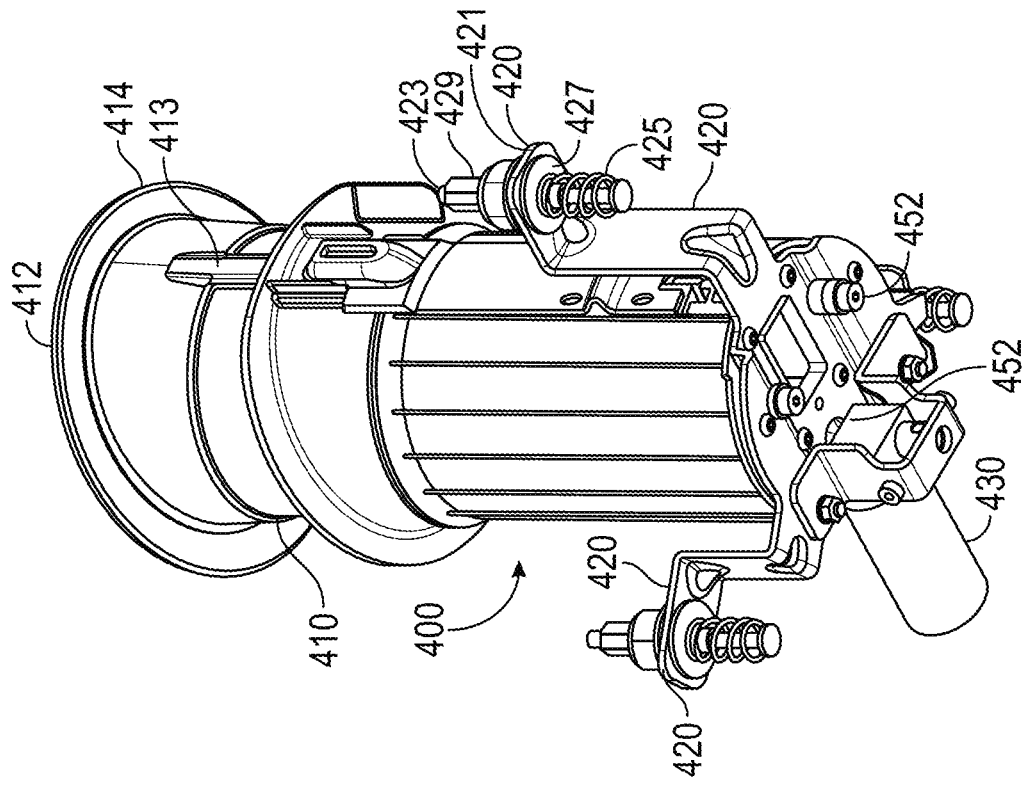
FIGS. 4A-4B illustrate a retractable sensor housing 400 containing a sensor 410 according to examples of the disclosure.
Figure 4A:
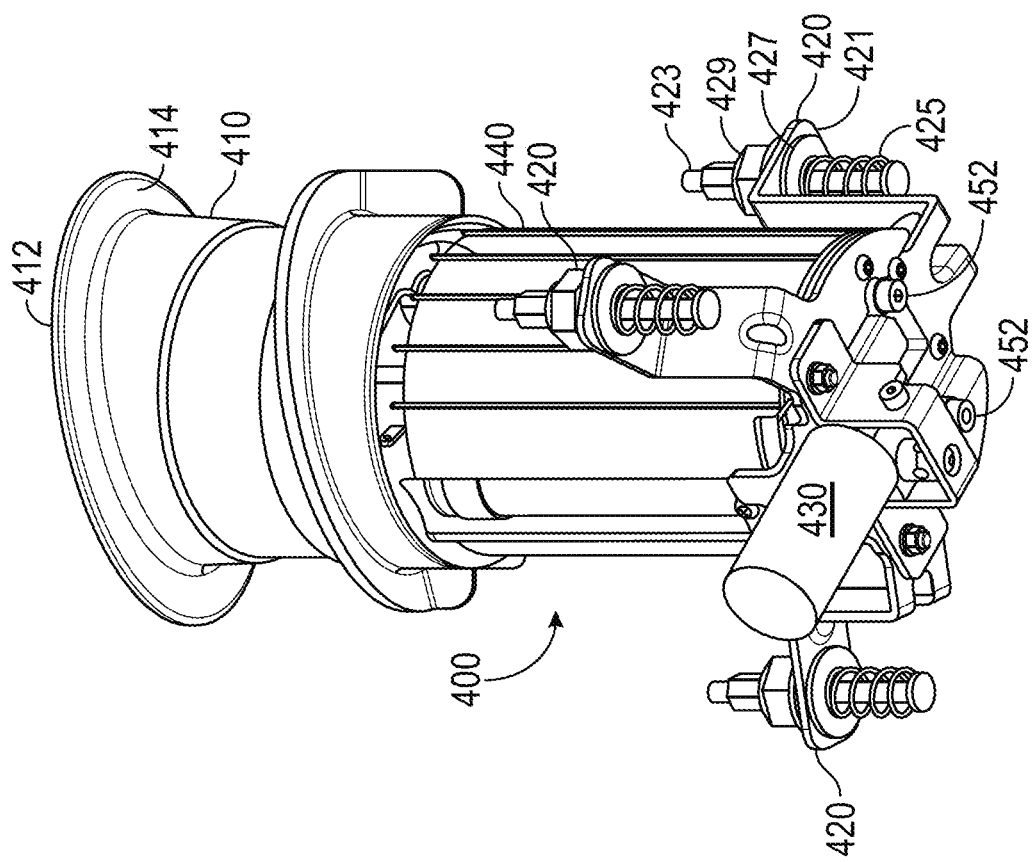

FIGS. 4A-4B illustrate a retractable sensor housing 400 containing a sensor 410 according to examples of the disclosure. In some embodiments, retractable sensor housing 400 includes brackets 420, motor 430, and housing body 440. Sensor 410 can include a LIDAR, an ultrasonic sensor, or another sensor for detecting the position of nearby objects, thereby allowing the vehicle to avoid a collision while operating in an autonomous driving mode. In some embodiments, sensor 410 is fitted with top cap 412 and light ring 414. Top cap 412 can include a channel 413 to accommodate one or more wires of light ring 414. Brackets 420 can include bracket body 421, bracket pin 423, spring 425, washer 427, and bracket retention nut 429. Motor 430 can be a linear actuator. Housing body 440 can include a movable body structure and a fixed body structure. In some embodiments, the sensor 410 is attached to the movable body structure and the assembly can be raised and lowered by motor 430 to retract and deploy the sensor. Support rails within housing body 440 can be attached by fasteners 452 (e.g., nuts and bolts, screws, nails, etc.). In some embodiments, motor 430 can be operated to raise and lower a moving part of the housing body 440 that is coupled to the sensor 410 to thereby raise and lower the sensor.

Brackets 420 can be attached to a vehicle chassis as shown in FIG. 2. In some embodiments, spring 425 enables the sensor housing 400 to deflect when exposed to vibration or when the sensor housing makes contact with an exterior object (e.g., a pedestrian, an animal, or an obstacle). Bracket body 421 can include holes through which pins 423 are inserted. In some embodiments, the holes have a diameter larger than the diameter of pins 423, thereby allowing the retractable sensor housing 400 to shift its position in the plane of the vehicle chassis when the sensor housing makes contact with an exterior object (e.g., a pedestrian, an animal, or an obstacle). Top cap 412 of sensor 410 can include a soft plastic material. In some embodiments, the soft material of top cap 412 and the ability of brackets 420 to retain the sensor housing 400 while allowing the position of the sensor housing to shift position can prevent a pedestrian or an animal from becoming injured or from damaging the sensor 410 or the housing 440 if they make contact with the sensor 410 while near the vehicle.

Figure 5B:
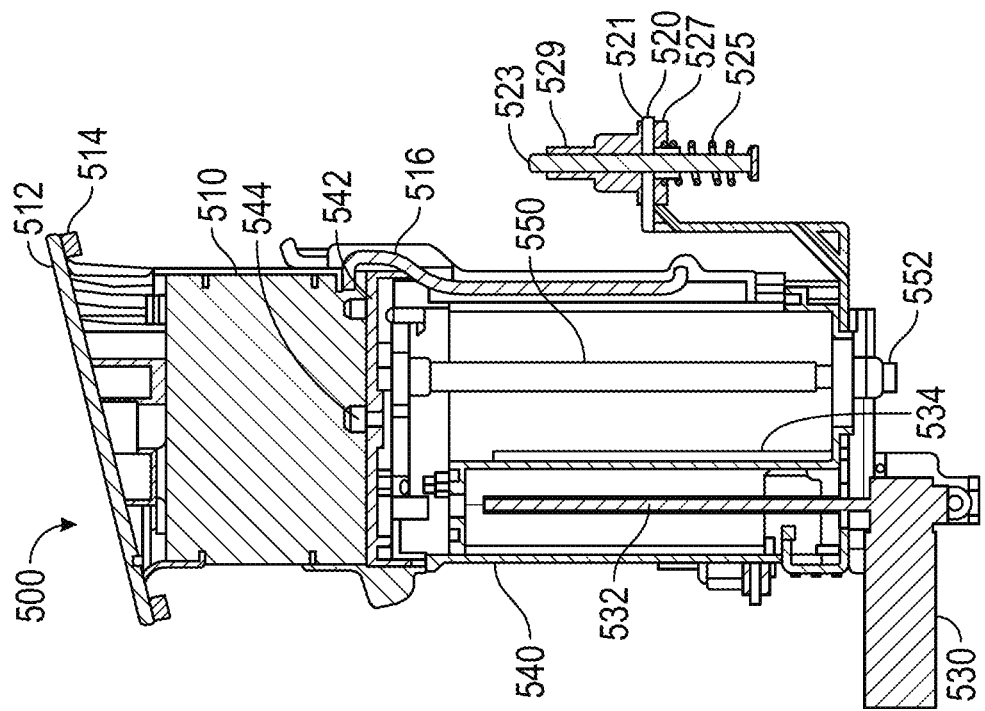
FIGS. 5A-5B illustrate a retractable sensor housing 500 according to examples of the disclosure.
Figure 5A:
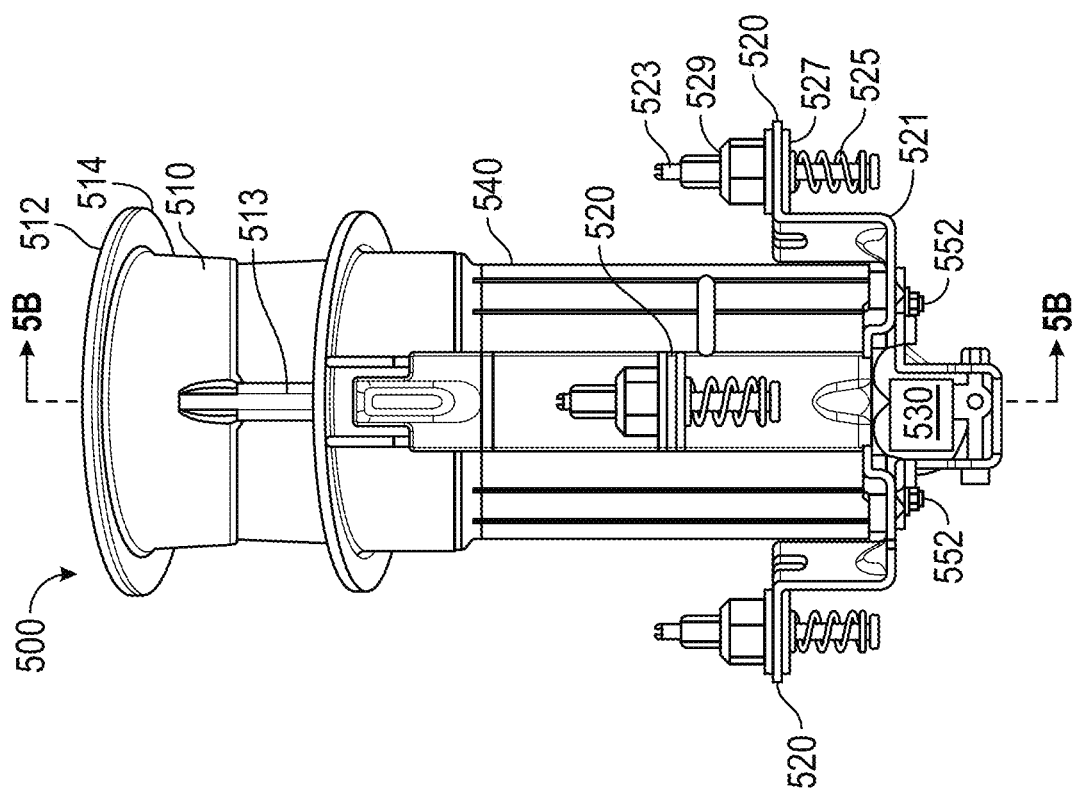

FIGS. 5A-5B illustrate a retractable sensor housing 500 according to examples of the disclosure. In some embodiments, sensor housing 500 includes brackets 520, motor 530, and housing body 540. Sensor housing 500 can house sensor 510.

Sensor 510 can include a LIDAR, an ultrasonic sensor, or another sensor for detecting the position of nearby objects. Sensor 510 can include wires 516. In some embodiments, sensor 510 is fitted with top cap 512 and light ring 514. Top cap 512 can include a channel 513 to accommodate one or more wires of light ring 514. In some embodiments, the light ring 514 can emit light to indicate when the sensor 510 is operating, thereby communicating to a user of the vehicle that the sensor is working correctly and communicating to pedestrians that the vehicle may be operating in an autonomous driving mode.

Brackets 520 can include bracket body 521, bracket pin 523, spring 525, washer 527, and bracket retention nut 529. As illustrated in FIG. 5B, a hole included in bracket body 521 can have a diameter wider than a diameter of bracket pin 523, as described above with reference to FIGS. 4A-4B.

Motor 530 can be a linear actuator including motor shaft 532 and positioner sensor 534. In some embodiments, as motor shaft 532 drives a moving part of housing body 540 upwards or downwards, positioner sensor 534 detects the position of the moving part of the housing body 540. Positioner sensor 534 can be a magnetic potentiometer that produces a variable resistance depending on the position of a magnet attached to the moving part of housing body 540. In some embodiments, the vehicle can include circuitry to sense the variable resistance of positioner sensor 534. In this way, positioner sensor 534 can sense the position of the moving part of housing body 540. In some embodiments, positioner sensor 534 is contained within housing body 540, isolated from the outside environment, thereby protecting the positioner sensor 534 from damage during operation and/or when other parts of the housing 500 (e.g., the sensor 510 or the motor 530) are being serviced.

Housing body 540 can include a movable body structure and a fixed body structure. In some embodiments, sensor 510 is attached to the movable body structure of the housing body 540 by a sensor bracket 542 fitted to the sensor with sensor bracket fastener 544 (e.g., a screw, a nut and bolt, or some other fastener). Sensor bracket 542 can attach to the movable body structure of the housing body 540, allowing the sensor 510 to be moved up and down. Support rails 550 within housing body 540 can be attached by support rail fasteners 552 (e.g., nuts and bolts, screws, nails, or other suitable fasteners) to support the movable body structure of the housing body 540. In some embodiments, sensor housing 500 includes two support rails 550, thereby providing three support structures including the motor shaft 531. Other numbers of support rails 550 are possible. In some embodiments, support rails 550 can include interconnecting rails, with an upper section attached to the movable body structure and the lower section connecting to the fixed body structure. In this way, the support rails 550 can expand to the height of the movable body structure to prevent rotation of the movable body structure as it moves up and down.

FIGS. 6A-6B illustrate a retractable sensor housing 600 according to examples of the disclosure. In some embodiments, sensor housing 600 includes brackets 620, motor 630, and housing body 640. Sensor housing 600 can house sensor 610.

Sensor 610 can include a LIDAR, an ultrasonic sensor, or another sensor for detecting the position of nearby objects. In some embodiments, sensor 610 is fitted with top cap 612 and light ring 614, as described above with reference to FIGS. 4-5, for example.

Brackets 620 can include bracket body 621, bracket pin 623, spring 625, washer 627, and bracket retention nut 629. As described above with reference to FIGS. 4-5, a hole included in bracket body 621 can have a diameter wider than a diameter of bracket pin 623.

Motor 630 can be a linear actuator including motor shaft 632. Motor shaft 632 can connect to the movable body structure of the housing body 640 at fastener 633 (e.g., a screw, a nut and bolt, or some other fastener). In some embodiments, as motor shaft 632 drives the movable body structure of housing body 640 upwards or downwards, positioner sensor 634 detects the position of the moving part of the housing body 640, as described above with reference to FIG. 5, for example. Positioner sensor 634 can be a magnetic potentiometer that produces a variable resistance depending on the position of a magnet attached to the moving part of housing body 640. In this way, positioner sensor 634 can sense the position of the moving part of housing body 640. In some embodiments, positioner sensor 634 is contained within housing body 640, isolated from the outside environment, thereby protecting the positioner sensor 634 from damage during operation and/or when other parts of the housing 600 (e.g., the sensor 610 or the motor 630) are being serviced.

Housing body 640 can include a movable body structure and a fixed body structure. In some embodiments, sensor 610 is attached to the movable body structure of housing body 640 by a sensor bracket 642 fitted to the sensor with sensor bracket fastener 644 (e.g., a screw, a nut and bolt, or some other fastener). Sensor bracket 642 can attach to the movable body structure of the housing body 640, allowing the sensor 610 to be moved up and down by motor 630.

Figure 7A:
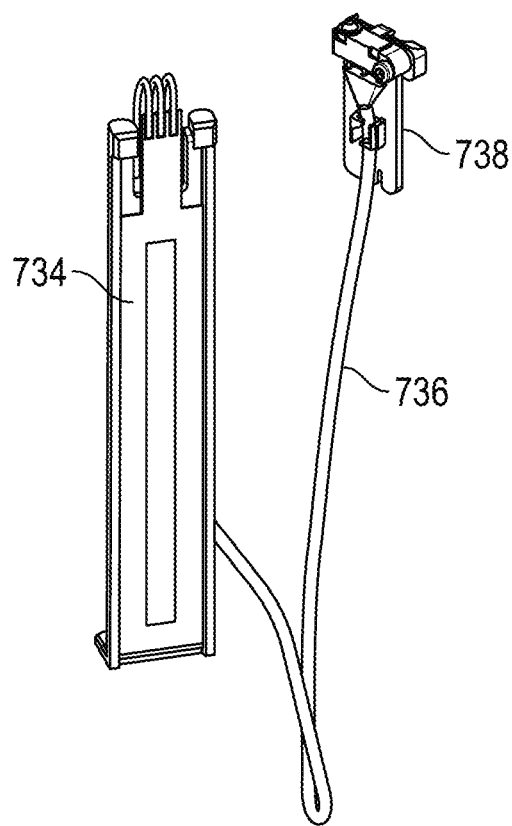
FIGS. 7A-7B illustrate a positioner sensor 734 according to examples of the disclosure.
Figure 7B:
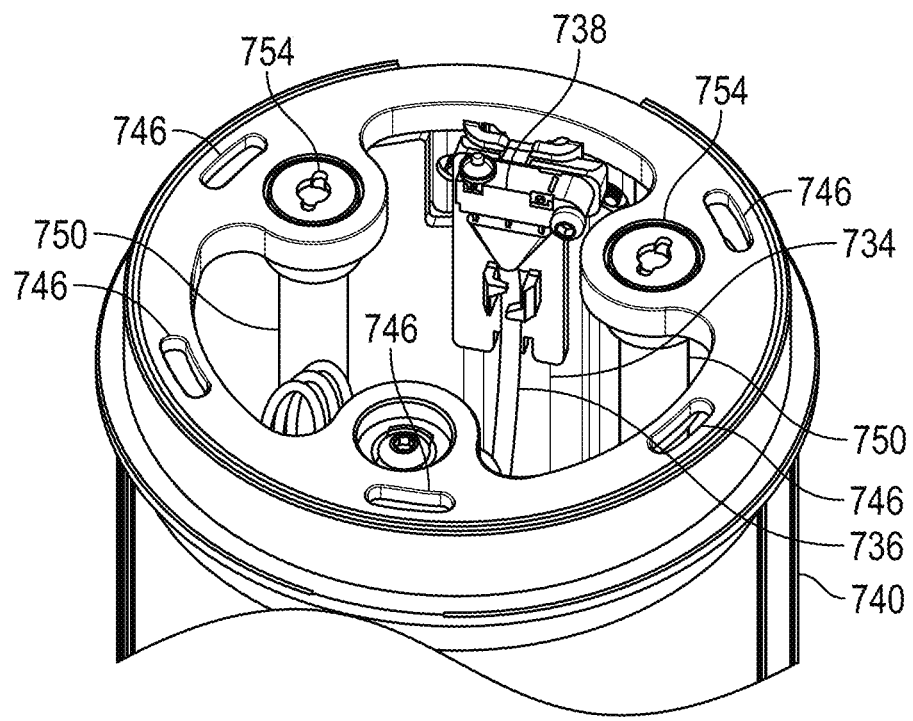

FIGS. 7A-7B illustrate a positioner sensor 734 according to examples of the disclosure. Positioner sensor 734 can be coupled via cable 736 to a limit switch 738 configured to control a maximum displacement of the movable body structure and the sensor. Housing body 740 can include support rails 750 connected to the housing body by fasteners 754. In some embodiments, a movable body structure of the housing body 740 includes holes 746 through which a sensor bracket can attach.

In some embodiments, positioner sensor 734 is a magnetic potentiometer. The magnetic potentiometer can be connected to a circuit to measure a resistance of the magnetic potentiometer that varies depending on the position of a magnetic part disposed on a movable body structure of the housing body 740 (e.g., similar to housing body 440, 540, and 640). Positioner sensor 734 and limit switch 738 can be mounted to the fixed body structure of housing body 740 so that the magnet moves relative to positioner sensor as the movable body structure moves relative to the fixed body structure. When a sensor bracket is attached to the housing body 740 via holes 746, the inside of the housing body can be sealed from the outside, thereby protecting the positioner sensor 734 and limit switch 738.

Figure 8:
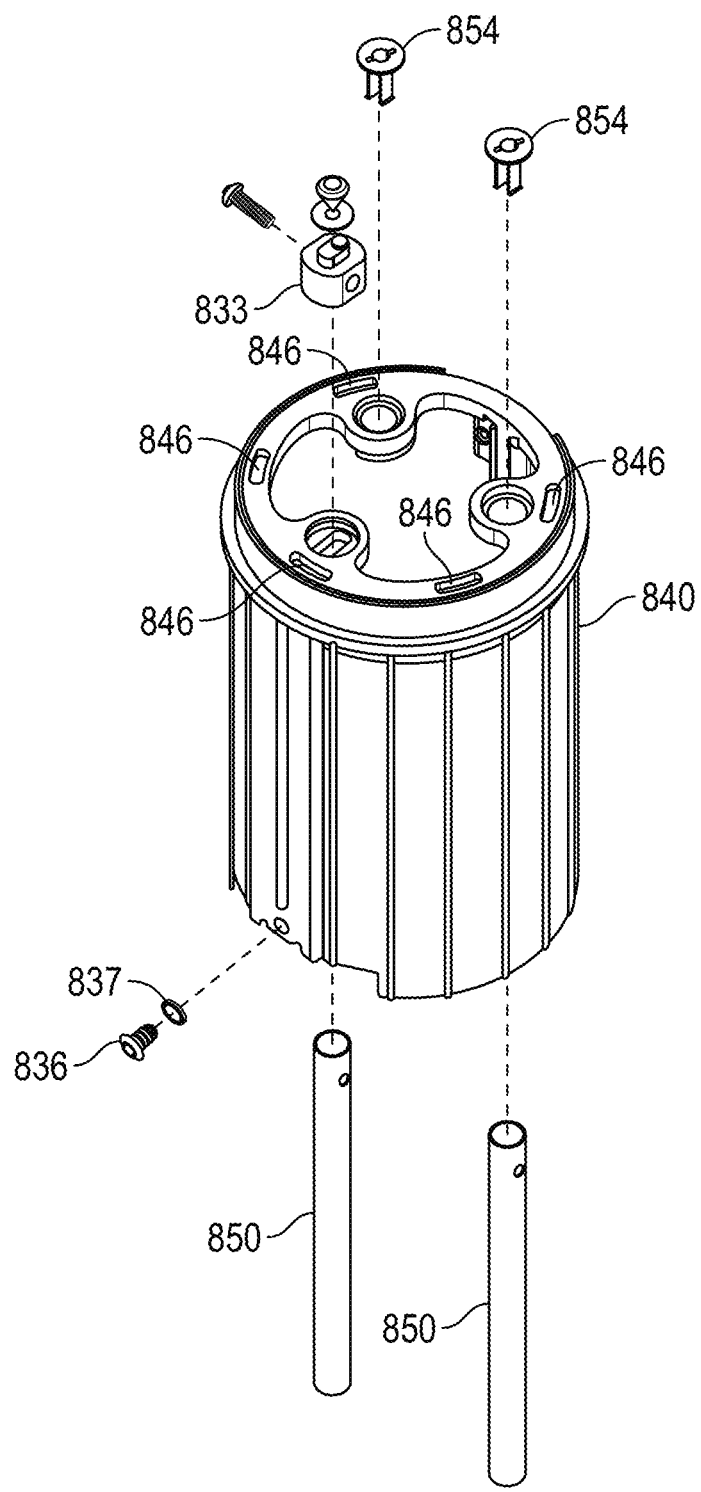
FIG. 8 illustrates a movable body structure 840 according to examples of the disclosure.

FIG. 8 illustrates movable body structure 840 according to examples of the disclosure. In some examples, movable body structure 840 can be attached to a sensor (e.g., sensor 210, 410, 510, or 610) and a motor (e.g., motor 430, 530, or 630), allowing the sensor to be raised and lowered by the motor.

Movable body structure 840 can be assembled into retractable sensor housings with a number of component parts. Support rails 850 can be attached to movable body structure 840 using fasteners 854. In some embodiments, fasteners 854 include clips, screws, nuts and bolts, or other suitable fasteners for attaching movable body structure 840 to support rails. Movable body structure 740 can be attached to a motor shaft using fasteners 836-837 and 833. As illustrated in FIG. 8, in some embodiments, a screw 836 and a washer 837 are used to attach movable body structure 840 to the motor shaft along a side of movable body structure. Additionally, fastener assembly 833 can be used to attach movable body structure 840 to the motor shaft at a top face of the movable body structure. Movable body structure 840 can further include holes 846 for attaching to a sensor bracket, as will be described below with reference to FIGS. 9A-9B.

Figure 9A:
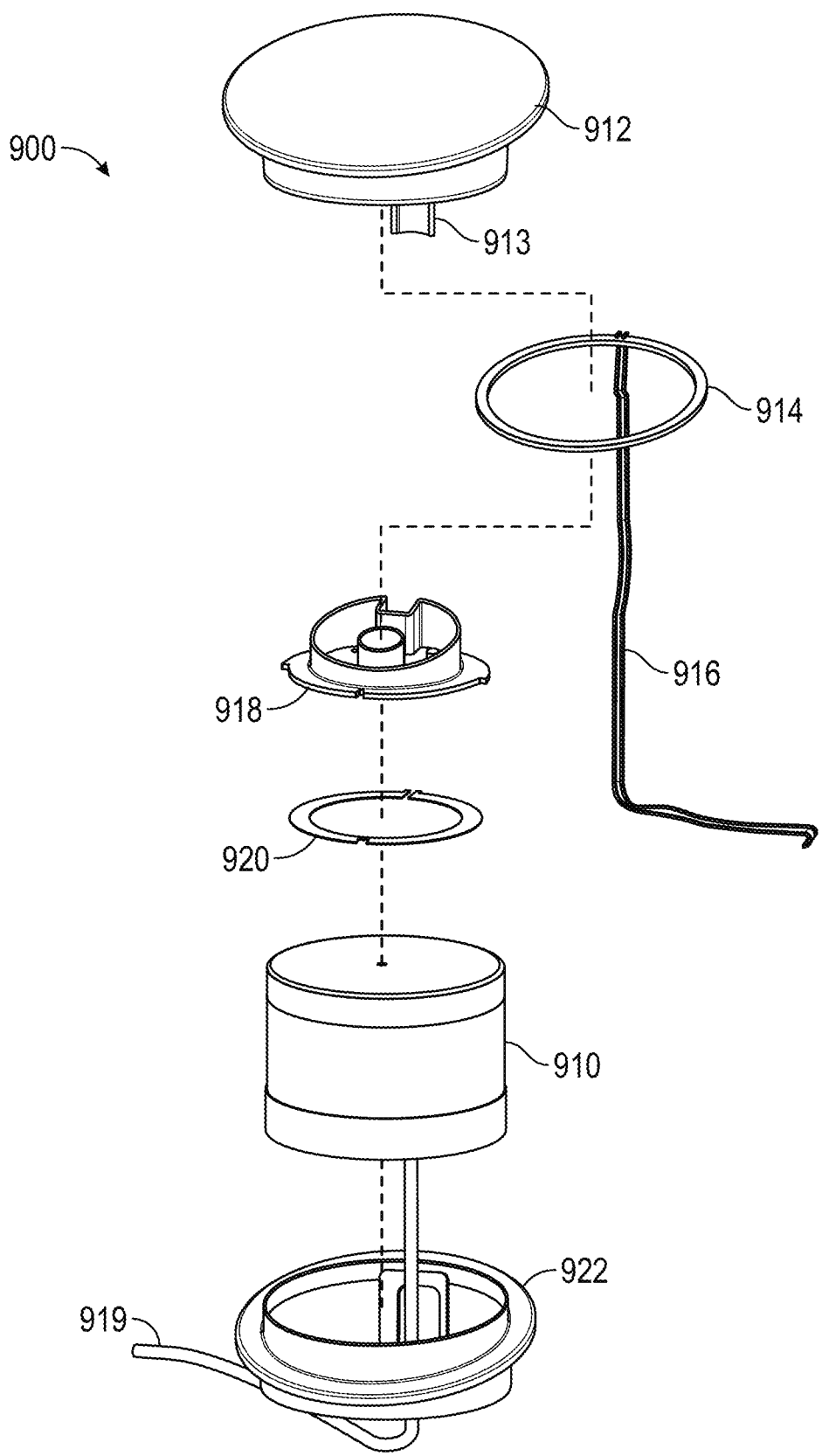
FIGS. 9A-9B illustrate a sensor assembly 900 according to examples of the disclosure.
Figure 9B:
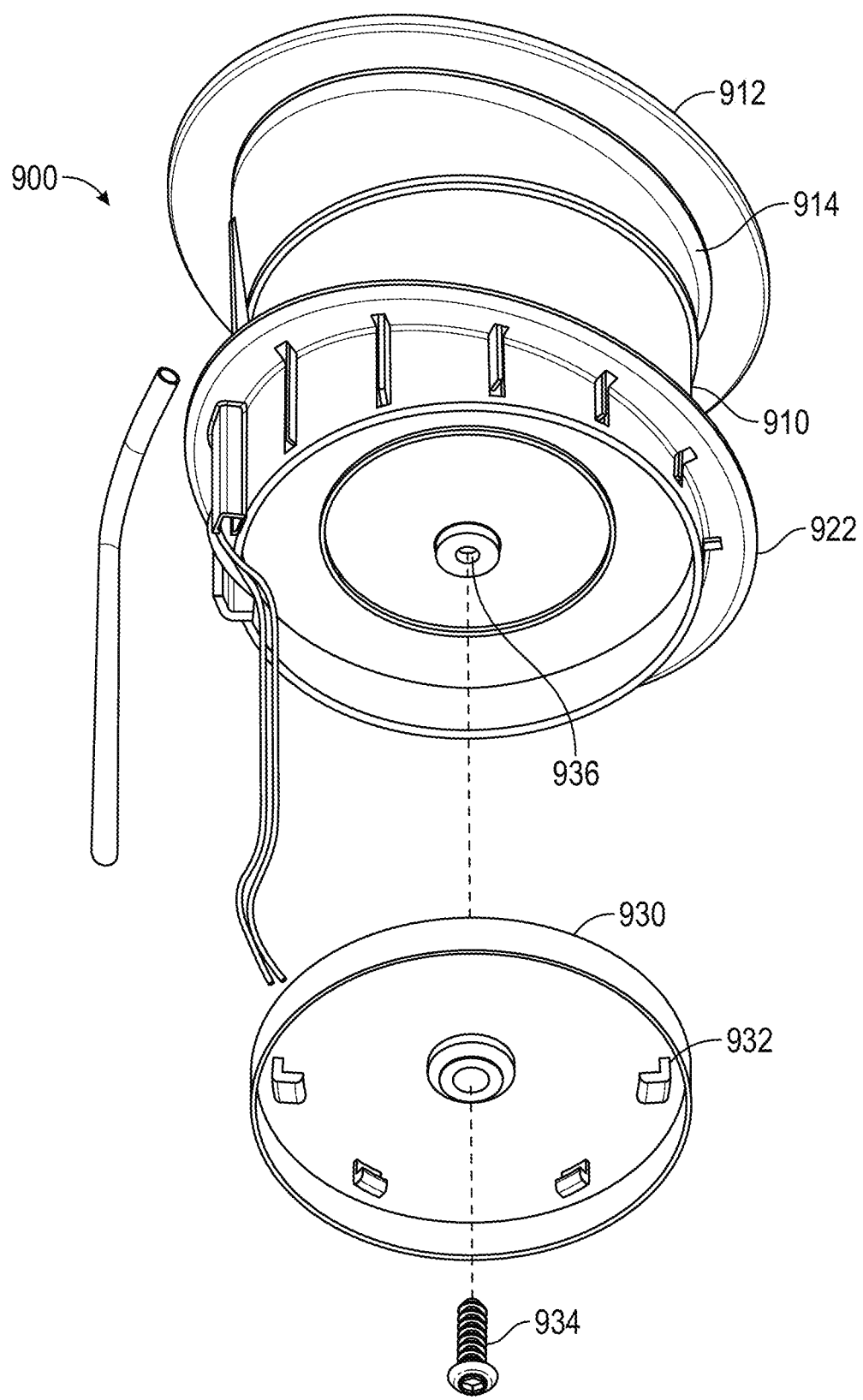

FIGS. 9A-9B illustrate a sensor assembly 900 according to examples of the disclosure. In some embodiments, sensor assembly 900 includes sensor 910 with cord 919, top cap 912 with channel 913, light ring 914 with cord 916, first alignment member 918, adhesive 920, and second alignment member 922. Sensor assembly 900 can be attached to sensor bracket 930 with fastener 934 at attachment feature 936.

FIG. 9A illustrates an exploded view of sensor assembly 900 according to examples of the disclosure. Sensor 910 can be a LIDAR, radar, ultrasonic sensor, range sensor, or another sensor capable of detecting nearby objects. In some embodiments, sensor 910 is fitted between first alignment member 918 and second alignment member 922 when the sensor assembly 900 is assembled. First alignment member 918 can be attached to sensor 910 by adhesive 920, for example. Light ring 914 can be attached to top cap 912. In some embodiments, light ring 914 can display light patterns to indicate when sensor 910 is operating (e.g., while the vehicle is operating in an autonomous driving mode) to alert nearby pedestrians and to confirm to the user of the vehicle that the sensor 910 is functioning correctly.

FIG. 9B illustrates the sensor assembly 900 and sensor bracket 930 according to examples of the disclosure. In some embodiments, sensor assembly 900 can be attached to sensor bracket 930 using fastener 934 (e.g., a screw) at attachment feature 936. Other types of fasteners are possible. In some embodiments, sensor bracket 930 includes hooks 932 that can be coupled to the housing body of a sensor housing (e.g., at holes 746 or 846). In this way, the sensor 910 can be removed and serviced or replaced if necessary without removing or taking apart the housing body of the retractable sensor housing.

Although multiple examples and embodiments of sensors, sensor housings, housing bodies, and their component parts are described above with reference to FIGS. 1-9, it should be understood that the details of two or more of the figures can be combined without departing from the scope of the invention. Sensors 107, 210, 410, 510, 610, 910, and any other sensor described herein and their component parts can be combined and/or modified without departing from the scope of the invention. Sensor housings 200, 310, 400, 500, and 600, and any other sensor housings described herein and their component parts can be combined and/or modified without departing from the scope of the invention. Housing bodies 440, 540, 640, 740, and any other housing bodies described herein and their component parts can be combined and/or modified without departing from the scope of the invention. It should be assumed that any other like-named components described herein can be combined, interchanged, and/or modified.

Therefore, according to the above, some examples of the disclosure are directed to an electronics housing assembly, comprising: a fixed body structure; a movable body structure; a motor operatively coupled to the movable body structure; a positioner sensor coupled to the fixed body structure, the positioner sensor configured to detect the position of the moveable body structure; and a sensor bracket attached to the movable body structure and configured to attach to a sensor. Additionally or alternatively, in some examples the electronics housing assembly further comprises a magnet mounted to the movable body structure; and a sensing circuit operatively coupled to the positioner sensor. Additionally or alternatively, in some examples the positioner sensor comprises a magnetic potentiometer, the resistance of the magnetic potentiometer varies with the position of the magnet mounted to the movable body structure, and the sensing circuit outputs a signal indicative of the resistance of the magnetic potentiometer. Additionally or alternatively, in some examples the electronics housing assembly further comprises a plurality of mounting brackets, the mounting brackets comprising bracket springs encircling bracket pins. Additionally or alternatively, in some examples the sensor housing assembly deflects in response to an applied force applied in the direction along which the bracket pins are disposed. Additionally or alternatively, in some examples the motor comprises a linear actuator. Additionally or alternatively, in some examples a limit switch configured to detect the position of the movable body structure and stop the operation of the motor when the position of the movable body structure reaches a threshold position. Additionally or alternatively, in some examples the positioner sensor and the limit switch are disposed inside of the fixed body structure. Additionally or alternatively, in some examples the electronics housing assembly further comprises one or more support rails disposed parallel to a motor shaft of the motor, the one or more support rails connected to the movable body structure and the fixed body structure and capable of expanding to the height of the movable body structure.

Some examples of the disclosure are directed to a vehicle comprising: a sensor; and a sensor housing assembly, comprising: a fixed body structure; a movable body structure; a motor operatively coupled to the movable body structure; a positioner sensor coupled to the fixed body structure, the positioner sensor configured to detect the position of the moveable body structure; and a sensor bracket attached to the movable body structure and attached to the sensor. Additionally or alternatively, in some examples the sensor housing assembly further comprises: a magnet mounted to the movable body structure; and a sensing circuit operatively coupled to the positioner sensor. Additionally or alternatively, in some examples the positioner sensor comprises a magnetic potentiometer, the resistance of the magnetic potentiometer varies with the position of the magnet mounted to the movable body structure, and the sensing circuit outputs a signal indicative of the resistance of the magnetic potentiometer. Additionally or alternatively, in some examples the vehicle further comprises a main chassis, wherein the sensor housing assembly is attached to the main chassis at a position beneath a front hood of the vehicle. Additionally or alternatively, in some examples the sensor housing assembly further comprises: a plurality of mounting brackets, the mounting brackets comprising bracket springs encircling bracket pins. Additionally or alternatively, in some examples the sensor housing assembly deflects in response to an applied force applied in the direction along which the bracket pins are disposed. Additionally or alternatively, in some examples the sensor is a LIDAR. Additionally or alternatively, in some examples the vehicle further comprises a light ring disposed circumferentially around the sensor. Additionally or alternatively, in some examples the vehicle further comprises one or more support rails disposed parallel to a motor shaft of the motor, the one or more support rails connected to the movable body structure and the fixed body structure and capable of expanding to the height of the movable body structure. Additionally or alternatively, in some examples the vehicle further comprises a limit switch configured to detect the position of the movable body structure and stop the operation of the motor when the position of the movable body structure reaches a threshold position. Additionally or alternatively, in some examples the positioner sensor and limit switch are disposed inside of the fixed body structure and the movable body structure.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An electronics housing assembly, comprising:
   a fixed body structure;
   a movable body structure;
   a motor operatively coupled to the movable body structure;
   a positioner sensor coupled to the fixed body structure, the positioner sensor configured to detect the position of the moveable body structure;
   a sensor bracket attached to the movable body structure and configured to attach to a sensor; and
   a plurality of mounting brackets, the mounting brackets comprising bracket springs encircling bracket pins, wherein the electronics housing assembly deflects in response to an applied force applied in the direction along which the bracket pins are disposed.

2. The electronics housing assembly of claim 1, further comprising:
   a magnet mounted to the movable body structure; and
   a sensing circuit operatively coupled to the positioner sensor.

3. The electronics housing assembly of claim 2, wherein:
   the positioner sensor comprises a magnetic potentiometer,
   the resistance of the magnetic potentiometer varies with the position of the magnet mounted to the movable body structure, and
   the sensing circuit outputs a signal indicative of the resistance of the magnetic potentiometer.

4. The electronics housing assembly of claim 1, wherein the motor comprises a linear actuator.

5. The electronics housing assembly of claim 1, further comprising:
   a limit switch configured to detect the position of the movable body structure and stop the operation of the motor when the position of the movable body structure reaches a threshold position.

6. The electronics housing assembly of claim 5, wherein:
   the positioner sensor and the limit switch are disposed inside of the fixed body structure.

7. The electronics housing assembly of claim 1, further comprising:
   one or more support rails disposed parallel to a motor shaft of the motor, the one or more support rails connected to the movable body structure and the fixed body structure and capable of expanding to the height of the movable body structure.

8. The vehicle of claim 1, wherein the sensor housing assembly further comprises:
   a magnet mounted to the movable body structure; and
   a sensing circuit operatively coupled to the positioner sensor.

9. The electronics housing assembly of claim 8, wherein:
   the positioner sensor comprises a magnetic potentiometer,
   the resistance of the magnetic potentiometer varies with the position of the magnet mounted to the movable body structure, and
   the sensing circuit outputs a signal indicative of the resistance of the magnetic potentiometer.

10. A vehicle comprising:
    a sensor; and
    a sensor housing assembly, comprising:
       a fixed body structure;
       a movable body structure;
       a motor operatively coupled to the movable body structure;
       a positioner sensor coupled to the fixed body structure, the positioner sensor configured to detect the position of the moveable body structure;
       a sensor bracket attached to the movable body structure and attached to the sensor; and
       a plurality of mounting brackets, the mounting brackets comprising bracket springs encircling bracket pins; wherein the sensor housing assembly deflects in response to an applied force applied in the direction along which the bracket pins are disposed.

11. The vehicle of claim 10, further comprising:
    a main chassis, wherein the sensor housing assembly is attached to the main chassis at a position beneath a front hood of the vehicle.

12. The vehicle of claim 10, wherein the sensor is a LIDAR.

13. The vehicle of claim 10, further comprising:
    a light ring disposed circumferentially around the sensor.

14. The vehicle of claim 10, further comprising:
    one or more support rails disposed parallel to a motor shaft of the motor, the one or more support rails connected to the movable body structure and the fixed body structure and capable of expanding to the height of the movable body structure.

15. The vehicle of claim 10, further comprising:
    a limit switch configured to detect the position of the movable body structure and stop the operation of the motor when the position of the movable body structure reaches a threshold position.

16. The vehicle of claim 15, wherein:
    the positioner sensor and limit switch are disposed inside of the fixed body structure and the movable body structure.

* * * * *